US011217814B2

(12) United States Patent
Takahashi et al.

(10) Patent No.: US 11,217,814 B2
(45) Date of Patent: Jan. 4, 2022

(54) FUEL BATTERY STACK

(71) Applicant: HONDA MOTOR CO., LTD., Tokyo (JP)

(72) Inventors: Motohiro Takahashi, Wako (JP); Jun Kondo, Wako (JP); Mitsuru Ikeo, Wako (JP); Hiromitsu Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 487 days.

(21) Appl. No.: 15/766,028

(22) PCT Filed: Oct. 4, 2016

(86) PCT No.: PCT/JP2016/079398
§ 371 (c)(1),
(2) Date: Apr. 5, 2018

(87) PCT Pub. No.: WO2017/061404
PCT Pub. Date: Apr. 13, 2017

(65) Prior Publication Data
US 2018/0309152 A1 Oct. 25, 2018

(30) Foreign Application Priority Data

Oct. 6, 2015 (JP) ................................. 2015-198204
Oct. 8, 2015 (JP) ................................. 2015-200042

(51) Int. Cl.
*H01M 8/2485* (2016.01)
*H01M 8/1004* (2016.01)
(Continued)

(52) U.S. Cl.
CPC ....... *H01M 8/2485* (2013.01); *H01M 8/1004* (2013.01); *H01M 8/241* (2013.01); *H01M 2008/1095* (2013.01)

(58) Field of Classification Search
CPC .. H01M 8/2485; H01M 8/241; H01M 8/1004; H01M 2008/1095; F16B 39/026;
(Continued)

(56) References Cited

U.S. PATENT DOCUMENTS 8,403,612 B2 * 3/2013 Wright .................... B60R 22/24
411/367
2009/0233139 A1 9/2009 Suzuki et al.
(Continued)

FOREIGN PATENT DOCUMENTS

DE 1804935 1/1960
DE 3842351 6/1990
(Continued)

OTHER PUBLICATIONS

JP 11-77689 English & original JP.*
(Continued)

*Primary Examiner* — Stephen J Yanchuk
(74) *Attorney, Agent, or Firm* — Amin, Turocy & Watson, LLP

(57) ABSTRACT

A fuel battery stack is provided with: hole portions formed in a coolant supplying manifold; cylindrical collar members provided in the hole portions; and fastening bolts inserted in the cylindrical collar members and screwed in a second end plate. On the inner circumferential surface of each of the hole portions, a plurality of projections that support the outer circumferential surface of the cylindrical collar member are provided so as to protrude radially inward.

2 Claims, 12 Drawing Sheets

(51) Int. Cl.
*H01M 8/241* (2016.01)
*H01M 8/1018* (2016.01)

(58) Field of Classification Search
CPC ...... F16B 39/225; F16B 19/05; F16B 43/001; F16B 5/0258
See application file for complete search history.

(56) References Cited

U.S. PATENT DOCUMENTS

| | | | |
|---|---|---|---|
| 2011/0097176 A1* | 4/2011 | Ichishima | B62D 21/11 411/367 |
| 2015/0288020 A1* | 10/2015 | Yamamoto | H01M 8/2415 429/460 |

FOREIGN PATENT DOCUMENTS

| | | |
|---|---|---|
| DE | 9014288 | 12/1990 |
| JP | 2006-049129 | 2/2006 |
| JP | 2009-224195 | 10/2009 |
| JP | 2010-055892 | 3/2010 |
| JP | 2015-060716 | 3/2015 |

OTHER PUBLICATIONS

International Search Report and Written Opinion for International Application No. PCT/JP2016/079398 dated Dec. 13, 2016, 8 pages.
Chinese Office Action for Chinese Patent Application No. 201680058531.3 dated Jun. 23, 2020.
German Office Action for German Patent Application No. 112016004572.7 dated Aug. 28, 2020.

\* cited by examiner

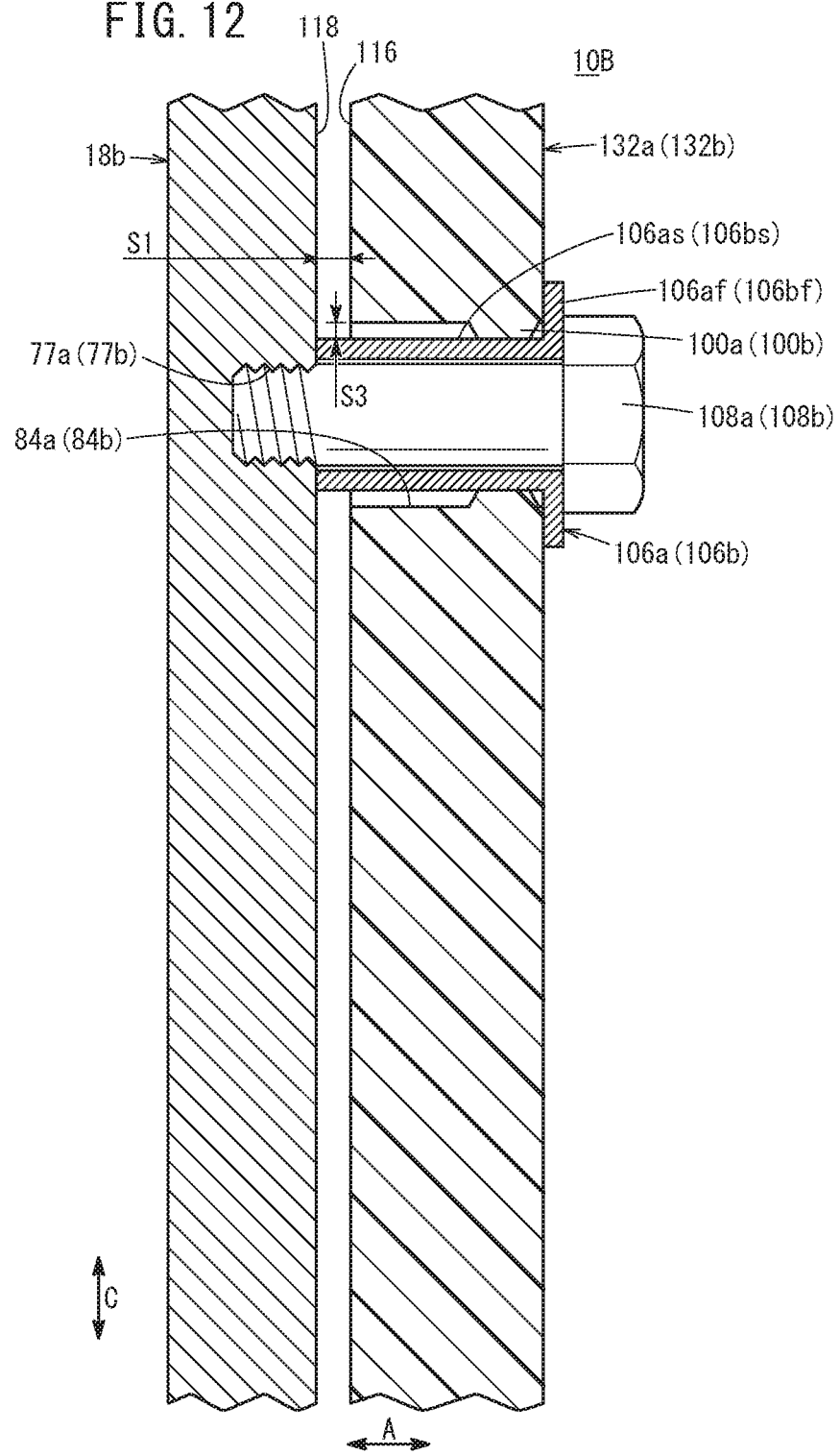

FUEL BATTERY STACK

TECHNICAL FIELD

The present invention relates to a fuel cell stack (fuel battery stack) including a plurality of power generation cells and end plates provided on both ends of the stack in a stacking direction. Each of the power generation cells is formed by stacking a membrane electrode assembly and a separator. The membrane electrode assembly includes an electrolyte membrane and electrodes provided on both surfaces of the electrolyte membrane.

BACKGROUND ART

For example, a solid polymer electrolyte fuel cell includes a membrane electrode assembly (MEA). The membrane electrode assembly includes an electrolyte membrane, an anode provided on one surface of the electrolyte membrane, and a cathode provided on the other surface of the electrolyte membrane. The electrolyte membrane is a polymer ion exchange membrane. The membrane electrode assembly is sandwiched between the separators to form a power generation cell (unit cell). In general, a predetermined number of power generation cells are stacked together to form, e.g. an in-vehicle fuel cell stack mounted in a fuel cell vehicle (fuel cell electric vehicle, etc.)

In the fuel cell stack, a fuel gas flow field is formed in a surface of an anode side separator for supplying a fuel gas to the anode, and an oxygen-containing flow field is formed in a surface of the cathode side separator for supplying an oxygen-containing gas to the cathode. Further, a coolant flow field as a passage of a coolant is provided between separators of power generation cells that are adjacent to each other, for supplying the coolant along surfaces of the separators.

Further, fuel cell stacks having internal manifold structure have been adopted. In such a fuel cell stack, fuel gas passages, oxygen-containing gas passages, and coolant passages extend through the fuel cell stack in the stacking direction for allowing the fuel gas, the oxygen-containing gas, and the coolant to flow through the fuel cell stack. The fuel gas passages (fluid passages) include a fuel gas supply passage and a fuel gas discharge passage. The oxygen-containing gas passages (fluid passages) include an oxygen-containing gas supply passage and an oxygen-containing gas discharge passage. The coolant passages (fluid passages) include a coolant supply passage and a coolant discharge passage.

In the above fuel cell stack, fluid manifolds connected to the fluid passages are provided in at least one of the end plates. Each of the fluid manifolds supplies or discharges fluid such as the fuel gas, the oxygen-containing gas, or the coolant. For example, in a fuel cell stack disclosed in Japanese Laid-Open Patent Publication No. 2009-224195, a resin manifold is provided in one of the end plates, and a reinforcement unit held by the one of the end plates is provided at an end of the resin manifold.

Further, in a fuel cell stack disclosed in Japanese Laid-Open Patent Publication No. 2015-060716, the fluid manifold has a rubber body. A rubber flange is provided integrally with a portion of the rubber body joined to an end plate, and the rubber flange is pressed and held on an end plate using a metal stopper member fixed to the end plate.

SUMMARY OF INVENTION

The present invention has been made in relation to this type of the technique, and an object of the present invention is to provide a fuel cell stack in which it is possible to suppress damage of a resin fluid manifold as much as possible, and use the resin fluid manifold suitably and economically.

Another object of the present invention is to provide a fuel cell stack in which it is possible to suppress damage of a resin fluid manifold due to deformation of an end plate as much as possible, and use the resin fluid manifold suitably and economically.

A fuel cell stack according to the present invention includes a plurality of power generation cells. Each of the power generation cells includes a membrane electrode assembly and a separator that are stacked together. The membrane electrode assembly includes an electrolyte membrane and electrodes provided on both surfaces of the electrolyte membrane. The power generation cells are stacked together in a stacking direction, end plates are provided at both ends in the stacking direction, and one of the end plates has a resin fluid manifold configured to allow a coolant, a fuel gas, or an oxygen-containing gas as fluid to flow through the resin fluid manifold.

The fuel cell stack includes a hole formed in the resin fluid manifold, a cylindrical collar member provided in the hole, and a tightening bolt inserted into the cylindrical collar member and screwed into the one of the end plates. A plurality of projections are formed on an inner circumferential surface of the hole. The projections protrude inward in a radial direction, and are configured to support an outer circumferential surface of the cylindrical collar member.

Further, preferably, the number of the projections may be three or more, and the projections may be formed on the inner circumferential surface of the hole at equal angular intervals.

In the fuel cell stack according to the present invention, the fuel cell stack includes a hole formed in the resin fluid manifold, a collar member provided in the hole, and a tightening bolt inserted into the collar member and screwed into one of the end plates. In a state where the resin fluid manifold is coupled tightly to the one of the end plates, a gap is formed between a manifold side facing surface and an end plate side facing surface.

The manifold side facing surface is a surface of the resin fluid manifold that faces the one of the end plates, and the end plate side facing surface is a surface of the one of the end plates that faces the resin fluid manifold.

Further, in the fuel cell stack, preferably, the resin fluid manifold may include a manifold base member and a manifold cover member. The manifold member is adjacent to one of the end plates, and the manifold cover member is fixedly overlapped with the manifold base member. A fluid channel is formed between the manifold base member and the manifold cover member.

In this regard, preferably, a gap may be formed between a base side facing surface of the manifold base member that faces the manifold cover member and a cover side facing surface of the manifold cover member that faces the manifold base member.

Further, in the fuel cell stack, preferably, at least one of the gaps may have a size in a range of 0.1 mm to 0.4 mm.

In the present invention, the outer circumferential surface of the cylindrical collar member is supported by the plurality of projections formed on the inner circumferential surface of the hole by point-to-point contact or line-to-line contact. In the structure, though the resin fluid manifold and, e.g., the metal cylindrical collar member are made of different materials, excessive stress is not applied to the fluid manifold and the cylindrical collar member due to the difference in linear thermal expansion caused by the temperature change.

Therefore, in particular, it becomes possible to suppress formation of cracks in the resin fluid manifold. Accordingly, it is possible to suppress damage of the resin fluid manifold as much as possible, and thus, it becomes possible to use the resin fluid manifold suitably and economically.

Further, in the present invention, in the state where the resin fluid manifold is coupled tightly to one of the end plates, the gap is formed between the manifold side facing surface and the end plate side facing surface. Therefore, when deformation occurs in one of the end plates, the gap functions as a clearance for suppressing interference with one of the end plates and the resin fluid manifold.

Therefore, it is possible to suppress formation of cracks, etc. when bending stress is applied to the resin fluid manifold. Accordingly, it is possible to suppress damage of the resin fluid manifold as much as possible due to deformation of one of the end plates, and thus, it becomes possible to use the resin fluid manifold suitably and economically.

BRIEF DESCRIPTION OF DRAWINGS

FIG. 12 is a cross sectional view of a coolant supply manifold and a second end plate of a fuel cell stack according to a third embodiment of the present invention.

DESCRIPTION OF EMBODIMENTS

First Embodiment

Figure 1:
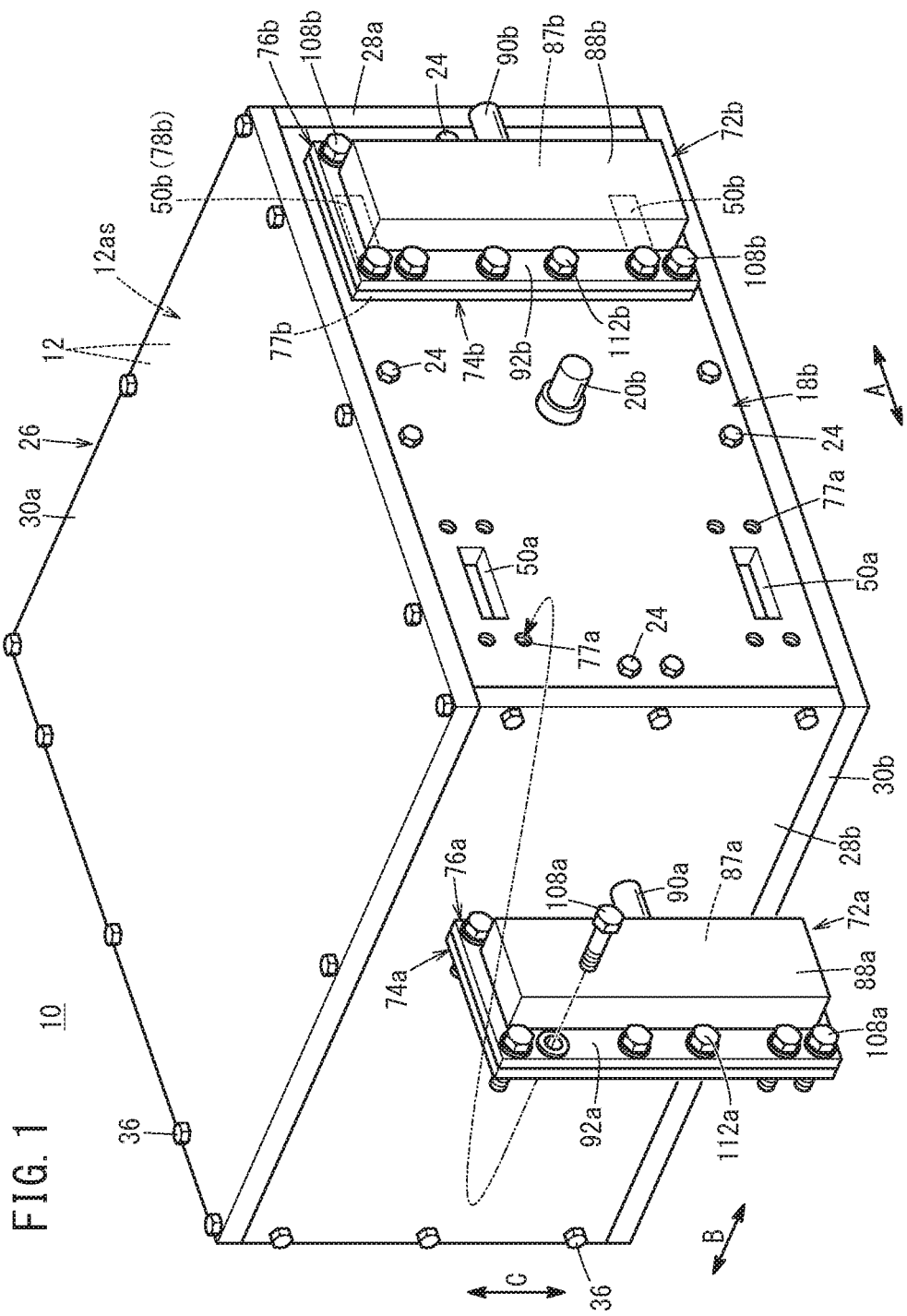
FIG. 1 is a perspective view as viewed from a second end plate of a fuel cell stack according to a first embodiment of the present invention.
Figure 2:
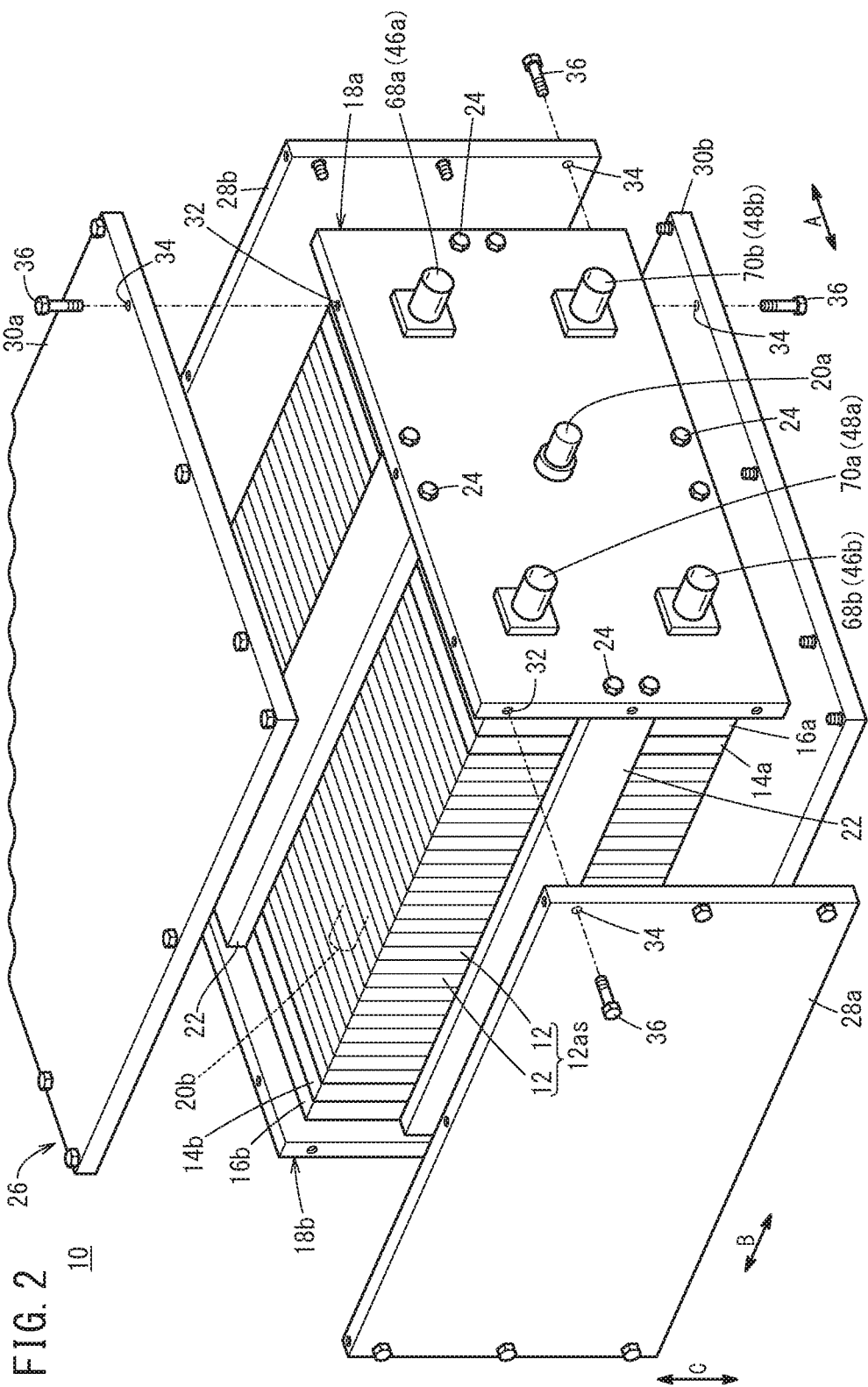
FIG. 2 is a partial exploded perspective view as viewed from a first end plate of the fuel cell stack.

As shown in FIGS. 1 and 2, a fuel cell stack 10 according to a first embodiment of the present invention is, for example, mounted in a fuel cell electric vehicle (not shown). The fuel cell stack 10 includes a stack body 12*as* formed by stacking a plurality of power generation cells 12 in a horizontal direction (indicated by an arrow B) such that electrode surfaces of the power generation cells 12 stand upright (see FIG. 2). It should be noted that the fuel cell stack 10 may be formed by stacking the plurality of power generation cells 12 in the gravity direction (indicated by an arrow C).

As shown in FIG. 2, at one end of the power generation cells 12 in the stacking direction (one end of the stack body 12*as*), a first terminal plate 14*a* is provided. A first insulating plate 16*a* is provided outside the first terminal plate 14*a*, and a first end plate 18*a* is provided outside the first insulating plate 16*a*. At another end of the power generation cells 12 in the stacking direction (another end of the stack body 12*as*), a second terminal plate 14*b* is provided. A second insulating plate 16*b* is provided outside the second terminal plate 14*b*, and a second end plate 18*b* is provided outside the second insulating plate 16*b*.

A first power output terminal 20*a* extends outward from a substantially central position (or a position shifted from the central position) of a laterally elongated (rectangular) first end plate 18*a*. The first power output terminal 20*a* is connected to the first terminal plate 14*a*. A second power output terminal 20*b* extends outward from a substantially central position (or a position shifted from the central position) of a laterally elongated (rectangular) second end plate 18*b*. The second power output terminal 20*b* is connected to the second terminal plate 14*b*.

Both ends of coupling bars 22 are fixed to the respective sides of the first end plate 18*a* and the second end plate 18*b* using screws 24. By the coupling bars 22, a tightening load (in the direction indicated by the arrow B) is applied to the stacked power generation cells 12.

The fuel cell stack 10 includes a casing 26 as necessary. Two sides (surfaces) of the casing 26 at both ends in the direction indicated by the arrow B are the first end plate 18*a* and the second end plate 18*b*. Two sides (surfaces) of the casing 26 at both ends in the direction indicated by the arrow A are a first side panel 28*a* and a second side panel 28*b* in the form of laterally elongated plates. Two sides (surfaces) of the casing 26 at both ends in the height direction (indicated by the arrow C) are an upper side panel 30*a* and a lower side panel 30*b*. Each of the upper side panel 30*a* and the lower side panel 30*b* has a laterally elongate plate.

As shown in FIG. 2, screw holes 32 are formed in each side of the first end plate 18*a* and the second end plate 18*b*. Holes 34 are formed in each of the first side panel 28*a*, the second side panel 28*b*, the upper side panel 30*a*, and the lower side panel 30*b* at positions facing the screw holes 32. Screws 36 inserted into the holes 34 are screwed into the screw holes 32. Thus, components of the casing 26 are fixed together.

Figure 3:
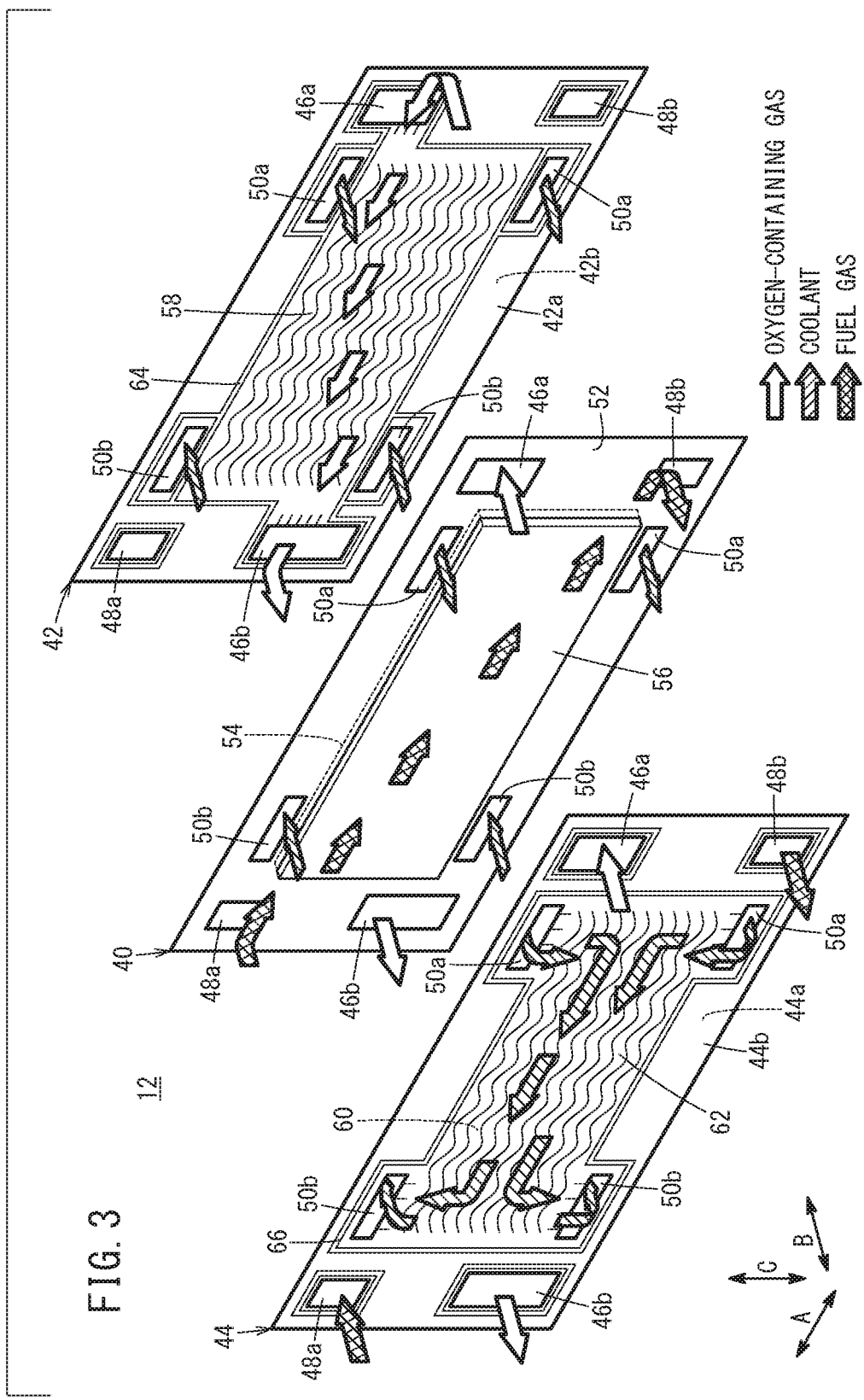
FIG. 3 is an exploded perspective view of main components of a power generation cell of the fuel cell stack.

As shown in FIG. 3, the power generation cell 12 includes a membrane electrode assembly 40, and a cathode separator 42 and an anode separator 44 sandwiching the membrane electrode assembly 40.

For example, the cathode separator 42 and the anode separator 44 are metal plates such as steel plates, stainless steel plates, aluminum plates, plated steel sheets, or metal plates having anti-corrosive surfaces by surface treatment. Each of the cathode separator 42 and the anode separator 44 has a rectangular plane surface. Each of the cathode separator 42 and the anode separator 44 has a rectangular shape and is formed by corrugating metal thin plates by press forming to have a corrugated shape in cross section and a wavy shape on the surface. It should be noted that, instead of the metal separators, for example, carbon separators may be used as the cathode separator 42 and the anode separator 44.

At one end of the power generation cells 12 in the longitudinal direction (indicated by an arrow A), an oxygen-containing gas supply passage 46a and a fuel gas discharge passage 48b are provided. The oxygen-containing gas supply passage 46a and the fuel gas discharge passage 48b extend through the power generation cell 12 in the direction indicated by an arrow B. An oxygen-containing gas (fluid) is supplied through the oxygen-containing gas supply passage 46a, and a fuel gas (fluid) such as a hydrogen-containing gas is discharged through the fuel gas discharge passage 48b.

At another end of the power generation cell 12 in the longitudinal direction, a fuel gas supply passage 48a for supplying the fuel gas, and an oxygen-containing gas discharge passage 46b for discharging the oxygen-containing gas are provided. The fuel gas supply passage 48a and the oxygen-containing gas discharge passage 46b extend through the power generation cell 12 in the direction indicated by the arrow B.

At one of both ends of the power generation cell 12 in the longitudinal direction (indicated by the arrow A) (one end in the horizontal direction), on the side adjacent to the oxygen-containing gas supply passage 46a and the fuel gas discharge passage 48b, coolant supply passages 50a are provided at upper and lower positions. The coolant supply passages 50a are connected to each other, for supplying a coolant (fluid) in the direction indicated by the arrow B. One coolant supply passage 50a is provided in each of opposite sides. Alternatively, two coolant supply passages 50a may be provided in each of opposite sides.

At another of both ends of the power generation cell 12 in the longitudinal direction (another end in the horizontal direction), on the side adjacent to the fuel gas supply passage 48a and the oxygen-containing gas discharge passage 46b, coolant discharge passages 50b are provided at upper and lower positions. The coolant discharge passages 50b are connected to each other, for discharging the coolant. One coolant discharge passage 50b is provided in each of opposite sides. Alternatively two coolant discharge passages 50b may be provided in each of opposite sides.

The membrane electrode assembly 40 includes a cathode 54, an anode 56, and a solid polymer electrolyte membrane 52 interposed between the cathode 54 and the anode 56. For example, the solid polymer electrolyte membrane 52 is formed by impregnating a thin membrane of perfluorosulfonic acid with water, for example.

Each of the cathode 54 and the anode 56 includes a gas diffusion layer (not shown). The gas diffusion layer comprises a carbon paper, etc. An electrode catalyst layer (not shown) is formed by platinum alloy supported on porous carbon particles. The carbon particles are deposited uniformly on the surface of the gas diffusion layer. The electrode catalyst layers are fixed to both surfaces of the solid polymer electrolyte membrane 52.

The cathode separator 42 has an oxygen-containing gas flow field 58 on its surface 42a facing the membrane electrode assembly 40. The oxygen-containing gas flow field 58 is connected to the oxygen-containing gas supply passage 46a and the oxygen-containing gas discharge passage 46b. The oxygen-containing gas flow field 58 comprises a plurality of wavy flow grooves (or straight flow grooves) extending in the direction indicated by the arrow A.

The anode separator 44 has a fuel gas flow field 60 on its surface 44a facing the membrane electrode assembly 40. The fuel gas flow field 60 is connected to the fuel gas supply passage 48a and the fuel gas discharge passage 48b. The fuel gas flow field 60 comprises a plurality of wavy flow grooves (or straight flow grooves) extending in the direction indicated by the arrow A.

A coolant flow field 62 is formed between a surface 44b of the anode separator 44 and a surface 42b of the cathode separator 42. The coolant flow field 62 is connected to the coolant supply passages 50a, 50a and the coolant discharge passages 50b, 50b. The coolant flow field 62 extends in the horizontal direction for allowing the coolant to flow over the electrode area of the membrane electrode assembly 40.

A first seal member 64 is formed integrally with the surfaces 42a, 42b of the cathode separator 42, around the outer marginal end of the cathode separator 42. A second seal member 66 is formed integrally with the surfaces 44a, 44b of the anode separator 44, around the outer marginal end of the anode separator 44.

Each of the first seal member 64 and the second seal member 66 is an elastic seal member made of, for example, a seal material, a cushion material, or a packing material such as an EPDM, an NBR, a fluoro rubber, a silicone rubber, a fluorosilicone rubber, a butyl rubber, a natural rubber, a styrene rubber, a chloroprene rubber, or an acrylic rubber.

As shown in FIG. 2, an oxygen-containing gas supply manifold 68a, an oxygen-containing gas discharge manifold 68b, a fuel gas supply manifold 70a, and a fuel gas discharge manifold 70b are attached to the first end plate 18a. The oxygen-containing gas supply manifold 68a, the oxygen-containing gas discharge manifold 68b, the fuel gas supply manifold 70a, and the fuel gas discharge manifold 70b are made of electrically insulating resin.

The oxygen-containing gas supply manifold 68a and the oxygen-containing gas discharge manifold 68b are connected to the oxygen-containing gas supply passage 46a and the oxygen-containing gas discharge passage 46b, respectively. The fuel gas supply manifold 70a and the fuel gas discharge manifold 70b are connected to the fuel gas supply passage 48a and the fuel gas discharge passage 48b, respectively.

As shown in FIG. 1, a resin coolant supply manifold (resin fluid manifold) 72a is attached to the second end plate (one of the end plates) 18b. The coolant supply manifold 72a is connected to the coolant supply passages 50a provided one at each of upper and lower positions. The second end plate 18b is attached to a resin coolant discharge manifold (resin fluid manifold) 72b. The coolant discharge manifold 72b is connected to the coolant discharge passages 50b provided one at each of upper and lower positions. Preferably, the coolant supply manifold 72a and the coolant discharge manifold 72b may have electrically insulating property.

Figure 4:
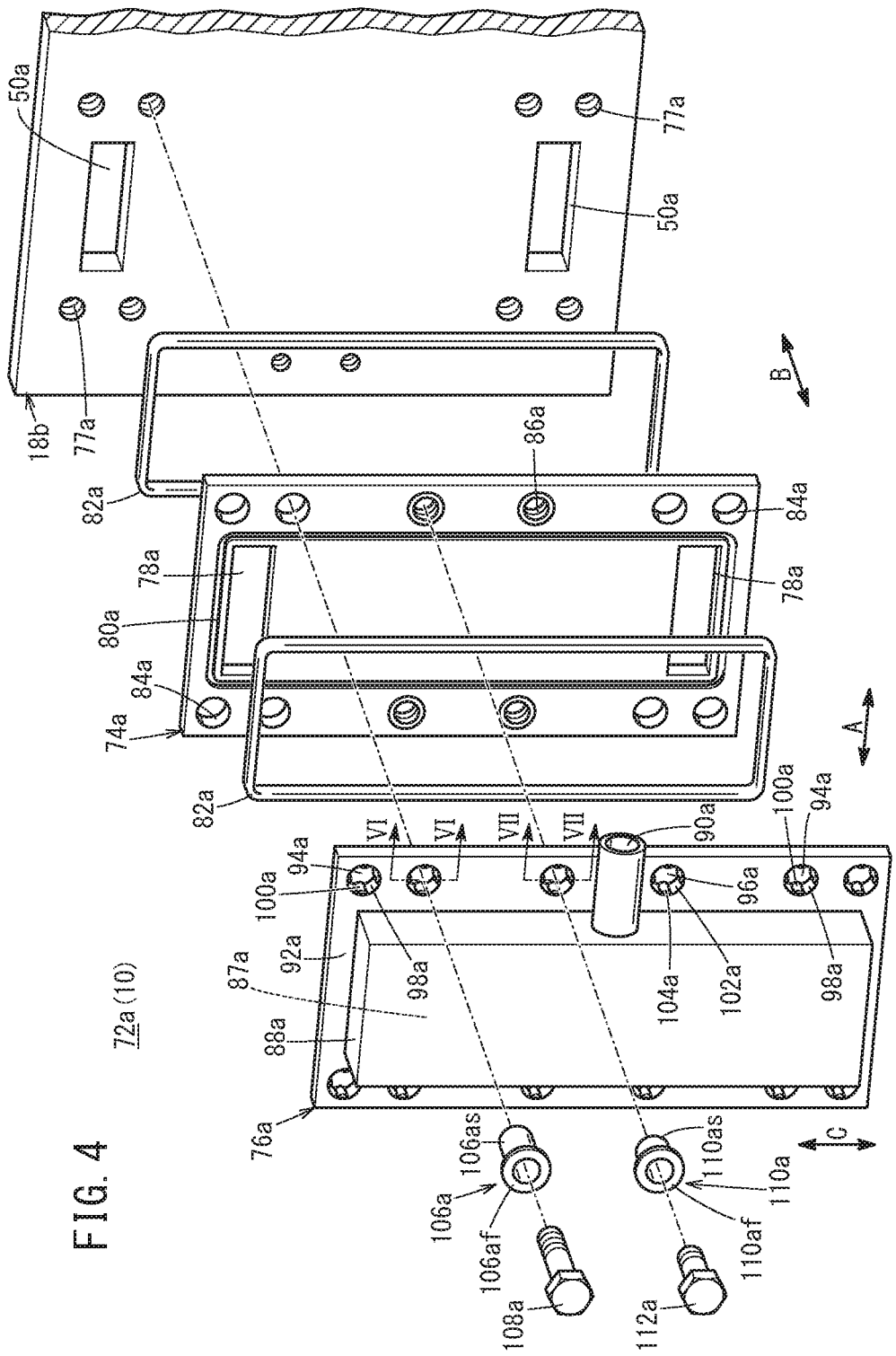
FIG. 4 is an exploded perspective view of a coolant supply manifold of the fuel cell stack.

As shown in FIGS. 1 and 4, the coolant supply manifold 72a includes a manifold base member 74a which contacts the second end plate 18b. The manifold base member 74a is fixed to a manifold cover member 76a, and the manifold cover member 76a is attached to the second end plate 18b. Four screw holes 77a are formed in the second end plate 18b, adjacent to each of the coolant supply passages 50a, and four screw holes 77b are formed in the second end plate 18b, adjacent to each of the coolant discharge passages 50b (see FIG. 1).

The manifold base member 74a has a substantially flat plate shape, and coolant inlets 78a are provided at the upper and lower positions of the manifold base member 74a. The coolant inlets 78a are directly connected to the coolant supply passages 50a, respectively. A peripheral groove 80a is formed around the upper and lower coolant inlets 78a on a surface of the manifold base member 74a facing the manifold cover member 76a. A seal member 82a is provided in the peripheral groove 80a, and as necessary, a peripheral groove (not shown) may be formed on an opposite surface of the manifold base member 74a, or a surface of the second end plate 18b and the seal member 82a may be provided in the peripheral groove.

The seal member 82a has a relatively large size in the thickness direction (stacking direction in which the manifold base member 74a and the manifold cover member 76a are stacked together). This is aimed to reliably suppress by elastic deformation, the leakage of coolant when gaps are formed between the manifold base member 74a and the second end plate 18b, and between the manifold base member 74a and the manifold cover member 76a.

Two holes 84a are formed at upper and lower positions, at each of both upper corners of the manifold base member 74a. Two holes 84a are formed at upper and lower positions, at each of both lower corners of the manifold base member 74a. The diameter of the opening of each of the holes 84a is larger than the outer diameter of a cylindrical collar member 106a described later, and provided coaxially with each of the screw holes 77a of the second end plate 18b. Two upper and two lower metal female screw members 86a are embedded at substantially the central positions of the manifold base member 74a in the height direction (indicated by the arrow C), on each of both sides in the direction indicated by the arrow A.

Figure 5:
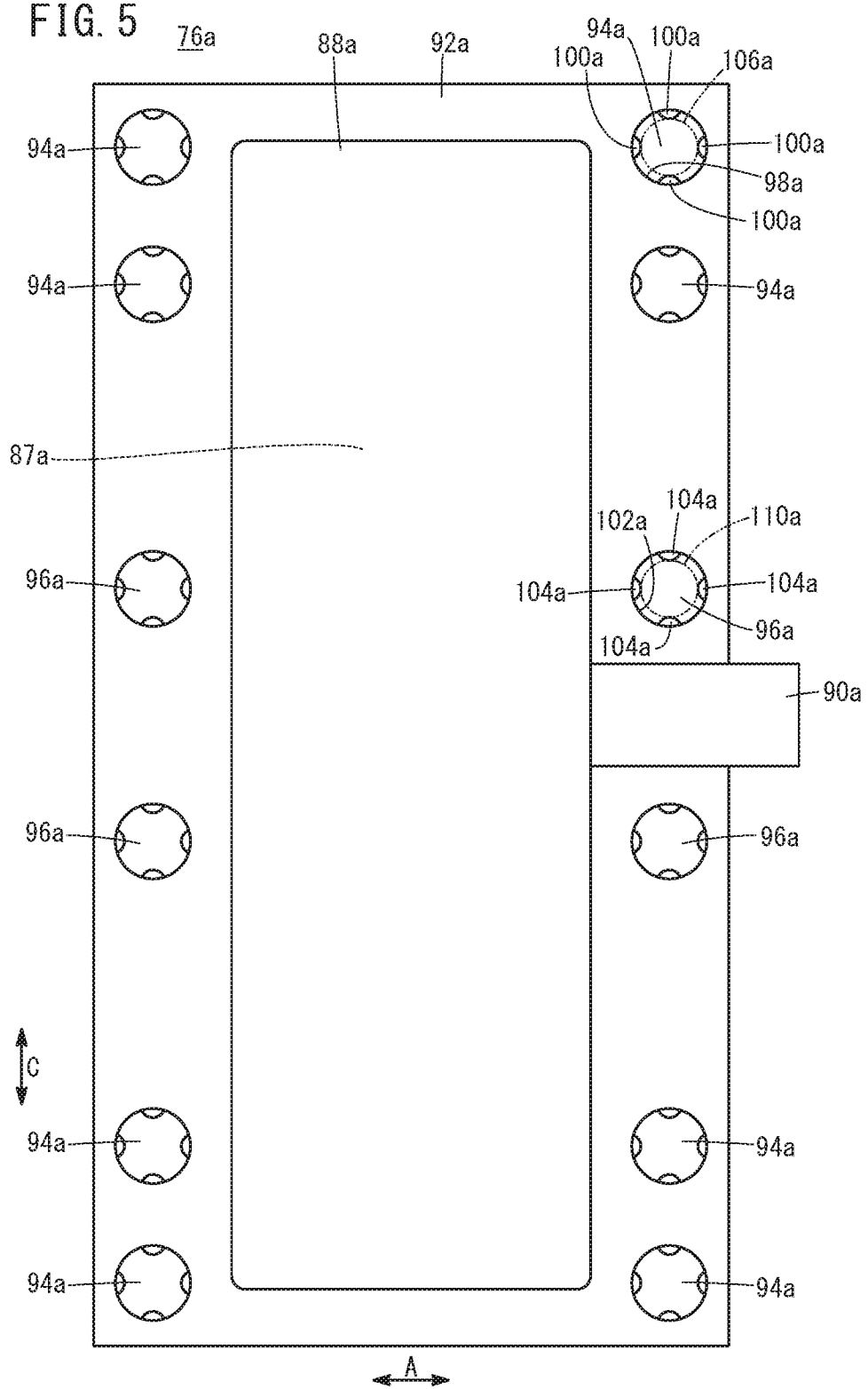
FIG. 5 is a front view of a manifold cover member of the coolant supply manifold.

As shown in FIGS. 4 and 5, the manifold cover member 76a has a body 88a in the form of a casing. A coolant channel 87a connected to the upper and lower coolant inlets 78a of the manifold base member 74a is formed in the body 88a. An inlet pipe portion 90a as a coolant supply port is provided at substantially the central position of the body 88a in the height direction. The inlet pipe portion 90a is oriented in the horizontal direction (or inclined from the horizontal direction). A flange 92a is provided in the outer marginal portion of the body 88a.

Two holes 94a are formed at upper and lower positions, at each of both upper corners of the flange 92a. Two holes 94a are formed at upper and lower positions, at each of both lower corners of the flange 92a. Two upper and two lower holes 96a are formed at substantially the central positions of the flange 92a in the height direction (indicated by the arrow C), on both sides in the direction indicated by the arrow A. The holes 94a of the flange 92a are formed coaxially with the holes 84a of the manifold base member 74a, and the holes 96a of the flange 92a are formed coaxially with the metal female screw member 86a of the manifold base member 74a.

As shown in FIG. 5, a plurality of, e.g., four projections 100a are provided on an inner circumferential surface 98a of the hole 94a. The projections 100a are spaced from one another at equal angular intervals, and protrude inward in the radial direction. It is sufficient that the projections 100a can support an outer circumferential surface 106as of the cylindrical collar member 106a described later. Preferably, three or more projections 100a may be provided. Further, it is sufficient that the projections 100a have a predetermined length in the axial direction of the inner circumferential surface 98a. The projections 100a may not be provided over the entire length in the axial direction.

A plurality of, e.g., four projections 104a are provided on inner circumferential surfaces 102a of the hole 96a. The projections 104a are spaced from one another at equal angular intervals, and protrude inward in the radial direction. It is sufficient that the projections 104a can support an outer circumferential surface 110as of a cylindrical collar member 110a described later. Preferably, three or more projections 104a may be provided. Further, it is sufficient that the projections 104a have a predetermined length in the axial direction of the inner circumferential surface 102a. The projection 104a may not be provided over the entire length in the axial direction.

Figure 6:
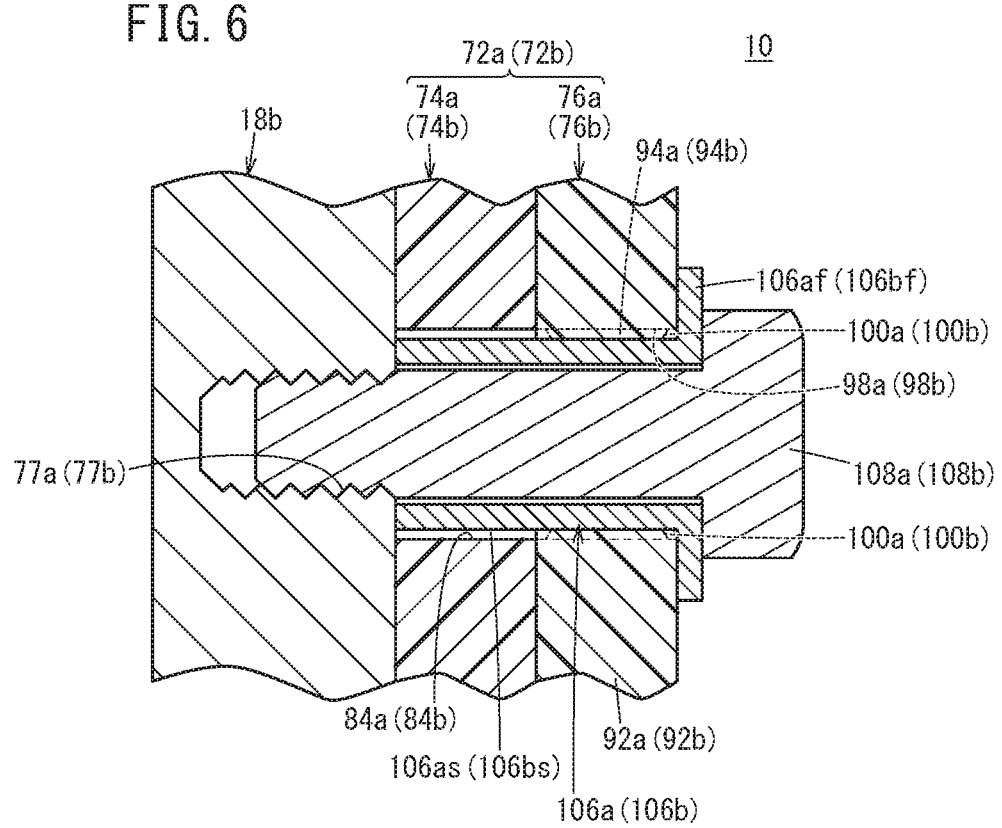
FIG. 6 is a cross sectional view of the coolant supply manifold and the second end plate, taken along a line VI-VI in FIG. 4.

As shown in FIG. 4, for example, the metal cylindrical collar member 106a is provided in each of the holes 94a. As shown in FIG. 6, the length of the cylindrical collar member 106a is determined such that the front end of the cylindrical collar member 106a contacts a plate surface of the second end plate 18b when the cylindrical collar member 106a is inserted from the hole 94a to the hole 84a.

The outer circumferential surface 106as of the cylindrical collar member 106a is supported by the four projections 100a, and a flange 106af contacts the flange 92a. A tightening bolt (hexagon bolt) 108a is inserted into the cylindrical collar member 106a, and the tightening bolt 108a is screwed into a screw hole 77a. Thus, the coolant supply manifold 72a is fixed to the second end plate 18b.

Figure 7:
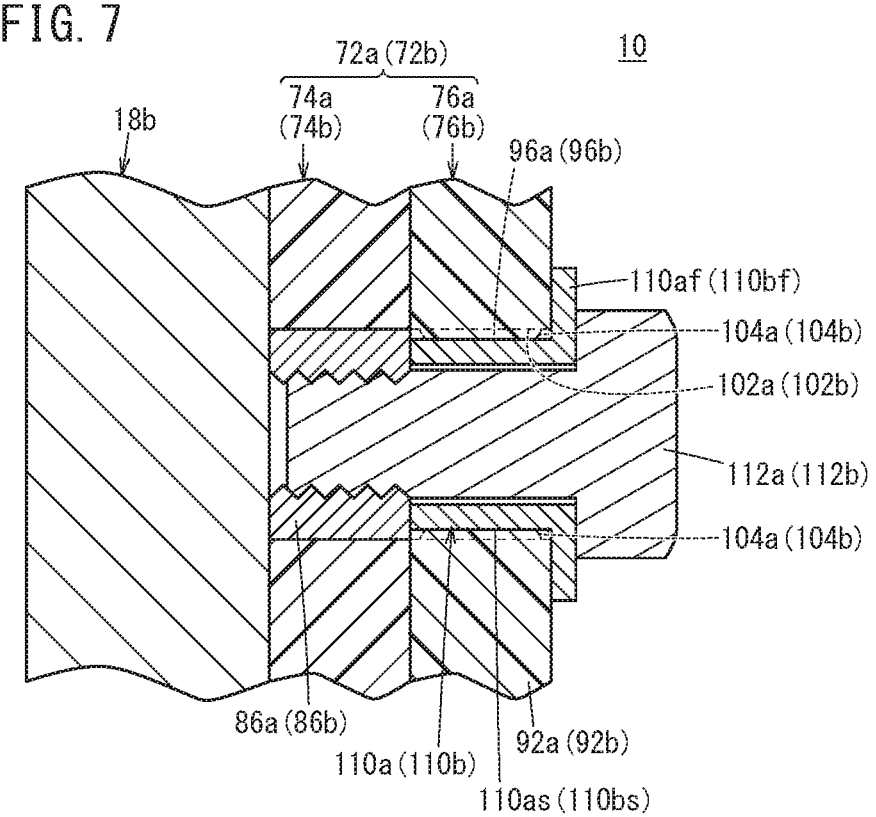
FIG. 7 is a cross sectional view of the coolant supply manifold and the second end plate, taken along a line VII-VII in FIG. 4.

As shown in FIG. 4, for example, the metal cylindrical collar member 110a is provided in each of the holes 96a. As shown in FIG. 7, the length of the cylindrical collar member 110a is determined such that the front end of the cylindrical collar member 110a contacts an end surface of the female screw member 86a of the manifold base member 74a when the cylindrical collar member 110a is inserted into the hole 96a.

The outer circumferential surface 110as of the cylindrical collar member 110a is supported by four projections 104a, and a flange 110af contacts the flange 92a. A tightening bolt (hexagon bolt) 112a is inserted into the cylindrical collar member 110a, and the tightening bolt 112a is screwed into a female screw member 86a. Thus, the manifold cover member 76a is fixed to the manifold base member 74a.

As shown in FIG. 1, the coolant discharge manifold 72b is fixed to the second end plate 18b. As shown in FIGS. 6 and 7, the constituent elements of the coolant discharge manifold 72b that are identical to those of the coolant supply manifold 72a are labeled with the same reference numerals and an alphabet "b" instead of "a", and detailed description is omitted. That is, the coolant discharge manifold 72b includes a manifold base member 74b, a manifold cover member 76b, cylindrical collar members 106b, 110b, and tightening bolts 108b, 112b. A hole 84b and a female screw 86b are provided for the manifold base member 74b. A flange 92b, and holes 94b, 96b are provided for the manifold cover member 76b. Projections 100b are provided on an inner circumferential surface 98b of the hole 94b. Projections 104b are provided on an inner circumferential surface 102b of the hole 96b. The collar member 106b has a flange 106bf and an outer circumferential surface 106bs, and the cylindrical collar member 110b has a flange 110bf and an outer circumferential surface 110bs. The tightening bolt 108b is screwed into the screw hole 77b.

Coolant outlet ports (fluid passages) 78b directly connected to the coolant discharge passage 50b are provided at upper and lower positions of the coolant discharge manifold 72b. In the coolant discharge manifold 72b, an outlet pipe 90b as a coolant discharge port is provided at substantially the central position of a body 88b of the manifold cover member 76b in the height direction. The outlet pipe 90b is oriented in a horizontal direction.

Operation of the fuel cell stack 10 having the above structure will be described.

Firstly, as shown in FIG. 2, an oxygen-containing gas is supplied from the oxygen-containing gas supply manifold 68a of the first end plate 18a to the oxygen-containing gas supply passage 46a. A fuel gas such as a hydrogen gas is supplied from a fuel gas supply manifold 70a of the first end plate 18a to the fuel gas supply passage 48a.

Further, as shown in FIG. 1, at the second end plate 18b, a coolant such as pure water, ethylene glycol or oil is supplied from the inlet pipe portion 90a of the coolant supply manifold 72a to the coolant channel 87a in the body 88a. The coolant is distributed to each of the coolant supply passages 50a formed at upper and lower positions of the coolant channel 87a.

Therefore, as shown in FIG. 3, the oxygen-containing gas flows from the oxygen-containing gas supply passage 46a to the oxygen-containing gas flow field 58 of the cathode separator 42. The oxygen-containing gas flows along the oxygen-containing gas flow field 58 in the direction indicated by the arrow A, and the oxygen-containing gas is supplied to the cathode 54 of the membrane electrode assembly 40.

In the meanwhile, the fuel gas flows from the fuel gas supply passage 48a to the fuel gas flow field 60 of the anode separator 44. The fuel gas flows along the fuel gas flow field 60 in the direction indicated by the arrow A, the fuel gas is supplied to the anode 56 of the membrane electrode assembly 40.

Thus, in the membrane electrode assembly 40, the oxygen-containing gas supplied to the cathode 54 and the fuel gas supplied to the anode 56 are partially consumed by the electrochemical reactions in the electrode catalyst layers to produce electricity.

Then, the oxygen-containing gas supplied to, and partially consumed at the cathode 54 of the membrane electrode assembly 40 is discharged along the oxygen-containing gas discharge passage 46b in the direction indicated by the arrow B. In the meanwhile, the fuel gas supplied to, and partially consumed at the anode 56 of the membrane electrode assembly 40 is discharged in the direction indicated by the arrow B along the fuel gas discharge passage 48b.

Further, the coolant supplied to the upper and lower coolant supply passages 50a flows into the coolant flow field 62 between the cathode separator 42 and the anode separator 44. The coolant supplied to the coolant supply passage 50a at the upper position and the coolant supplied to the coolant supply passage 50a at the lower position flow temporarily toward each other, i.e., flow inward in the direction indicated by the arrow C, and then, the coolant moves in the direction indicated by the arrow A for cooling the membrane electrode assembly 40. After the coolant moves outward in the direction in the direction indicated by the arrow C, the coolant is discharged along the coolant discharge passages 50b at the upper and lower positions, in the direction indicated by the arrow B.

As shown in FIG. 1, the coolant is discharged from the coolant discharge passage 50b at the upper position and the coolant discharge passage 50b at the lower position to a coolant channel 87b in the body 88b of the coolant discharge manifold 72b. After the coolant flows toward the center of the body 88b, the coolant is discharged from the outlet pipe 90b to the outside.

In the embodiment of the present invention, as shown in FIGS. 4 to 6, the holes 84a, 94a are formed in the manifold base member 74a and the manifold cover member 76a of the coolant supply manifold 72a. Further, the cylindrical collar member 106a is formed integrally with the holes 84a, 94a. In this regard, the outer circumferential surface 106as of the cylindrical collar member 106a is supported by the plurality of projections 100a by point-to-point contact or line-to-line contact. The projections 100a are formed on the inner circumferential surface 98a of the hole 94a, and spaced from one another at equal angular intervals, protruding inward in the radial direction.

In the structure, though the resin coolant supply manifold 72a and the metal cylindrical collar member 106a are made of different materials, excessive stress is not applied to the coolant supply manifold 72a and the cylindrical collar member 106a due to the difference in linear thermal expansion caused by the temperature change.

Therefore, in particular, it becomes possible to suppress formation of cracks in the coolant supply manifold 72a as a resin product. As a result, advantageously, it is possible to suppress damage of the coolant supply manifold 72a as much as possible, and thus, it becomes possible to use the coolant supply manifold 72a suitably and economically. The coolant discharge manifold 72b has the same structure as the above coolant supply manifold 72a. Therefore, in the coolant discharge manifold 72b, the same advantages as in the case of the coolant supply manifold 72a can be obtained.

Further, as shown in FIGS. 4, 5, and 7, the hole 96a is formed in the manifold cover member 76a of the coolant supply manifold 72a, and the cylindrical collar member 110a is inserted into the hole 96a. In this regard, the outer circumferential surface 110as of the cylindrical collar member 110a is supported by the plurality of projections 104a by point-to-point contact or line-to-line contact. The projections 104a are formed on the inner circumferential surface 102a of the hole 96a, and spaced from one another at equal angular intervals, protruding inward in the radial direction.

In the structure, though the resin manifold cover member 76a and the metal cylindrical collar member 110a are made of different materials, excessive stress is not applied to the resin manifold cover member 76a and the metal cylindrical collar member 110a due to the difference in linear thermal expansion caused by the temperature change.

In the embodiment of the present invention, the coolant supply manifold 72a is formed by separate members, i.e., the manifold base member 74a and the manifold cover member 76a. However, the present invention is not limited in this respect. For example, the manifold base member 74a and the manifold cover member 76a may be formed integrally to form the coolant supply manifold 72a as a single component part. Likewise, the coolant discharge manifold 72b may be formed as a single component part. Further, the present invention is not limited to the application for the coolant. The present invention is also applicable to reactant gas supply manifolds and reactant gas discharge manifolds for the fuel gas and the oxygen-containing gas.

Second Embodiment

Next, a fuel cell stack 10A according to a second embodiment of the present invention will be described. The constituent elements of the fuel cell stack 10A that are identical to those of the fuel cell stack 10 are labeled with the same reference numerals, and detailed description is omitted.

Figure 8:
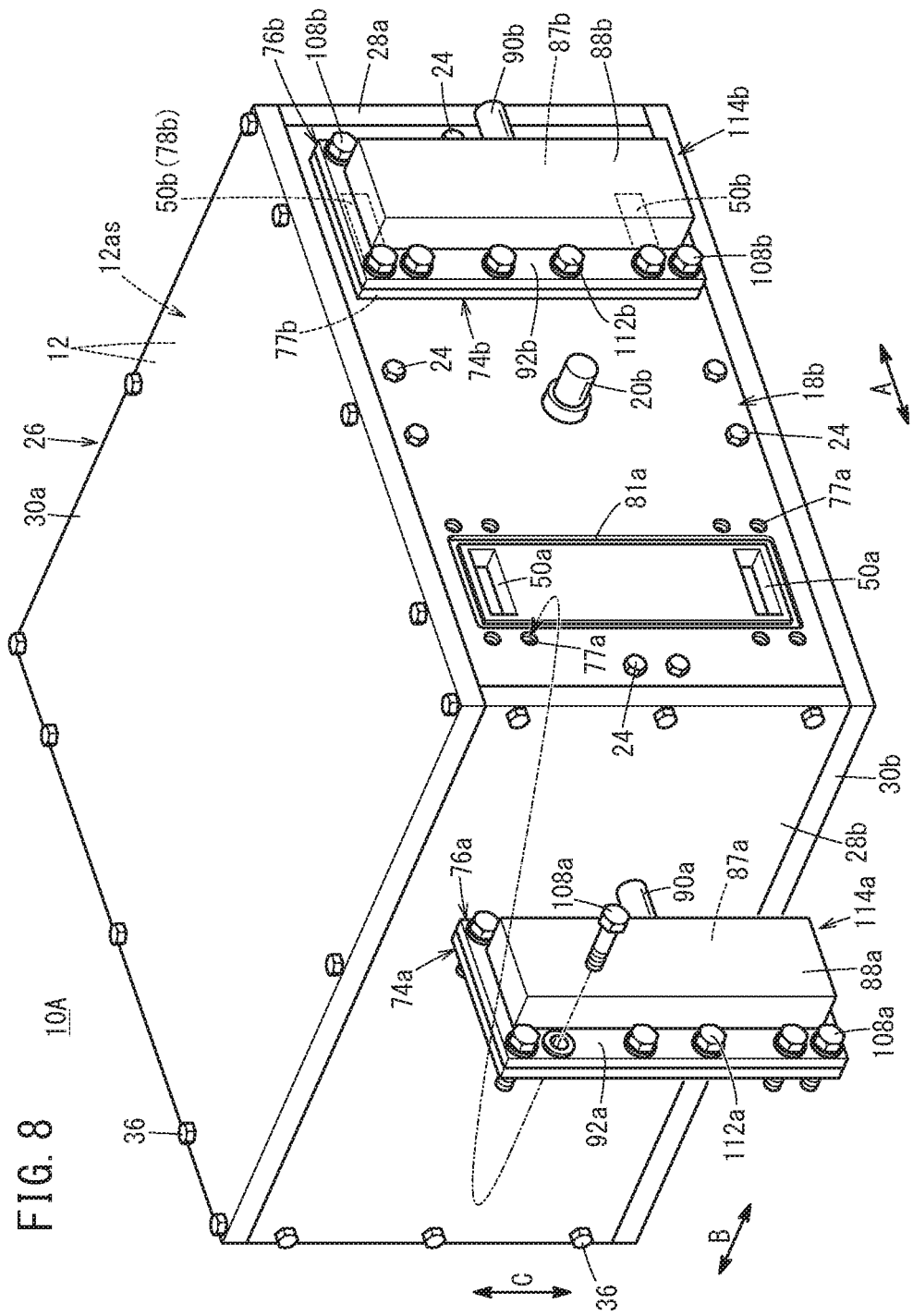
FIG. 8 is a perspective view as viewed from a second plate of a fuel cell stack according to a second embodiment of the present invention.
Figure 9:
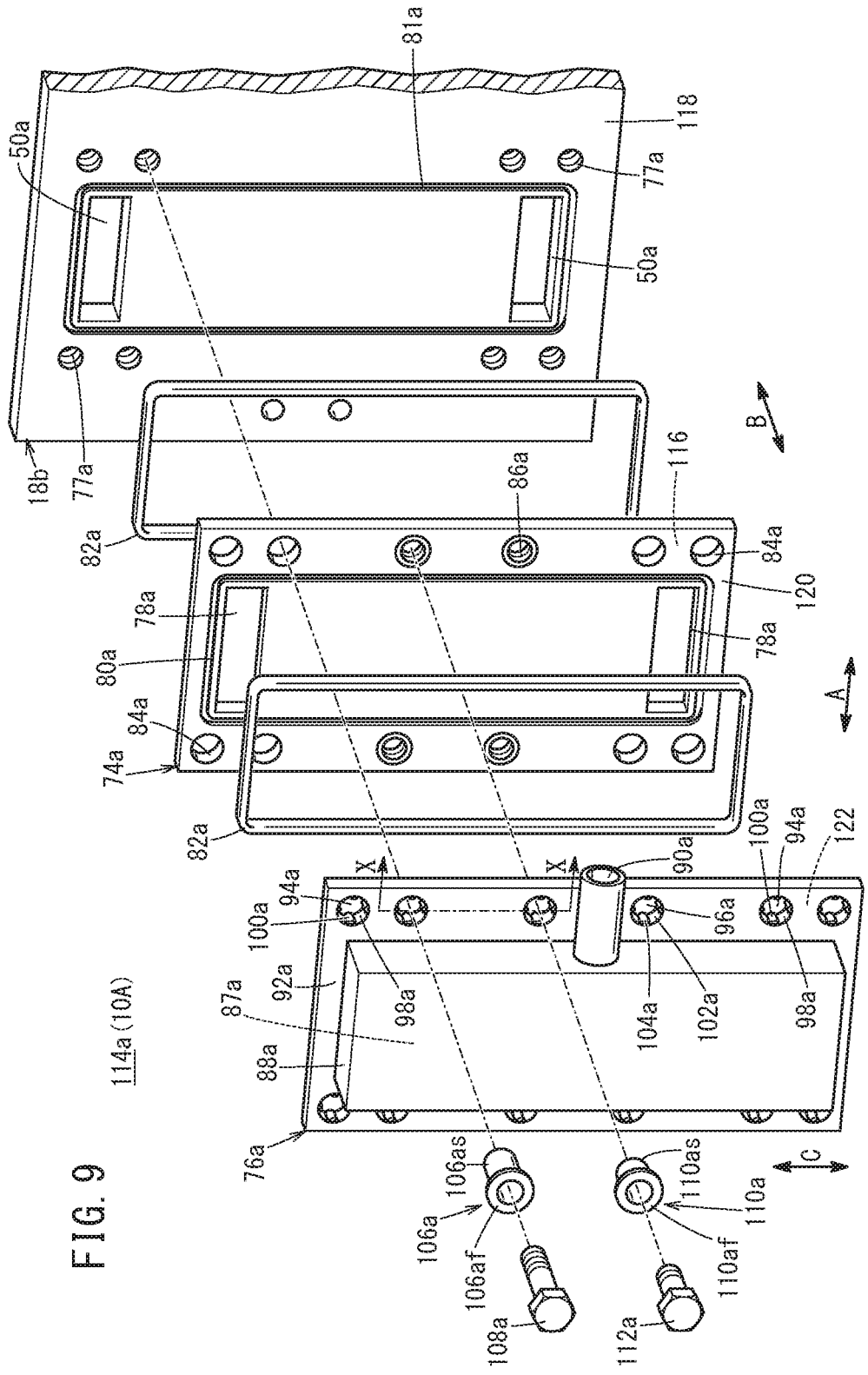
FIG. 9 is an exploded perspective view of a coolant supply manifold of the fuel cell stack in FIG. 8.

As shown in FIG. 8, the fuel cell stack 10A according to the embodiment of the present invention includes a coolant supply manifold 114a instead of the coolant supply manifold 72a, and a coolant discharge manifold 114b instead of the coolant discharge manifold 72b. As shown in FIG. 9, in the coolant supply manifold 114a, a seal member 82a is provided between the manifold base member 74a and the second end plate 18b through a peripheral groove 81a formed in the second end plate 18b. The manifold base member 74a is supported by the cylindrical collar member 106a in a floating manner (see FIG. 10).

Figure 10:
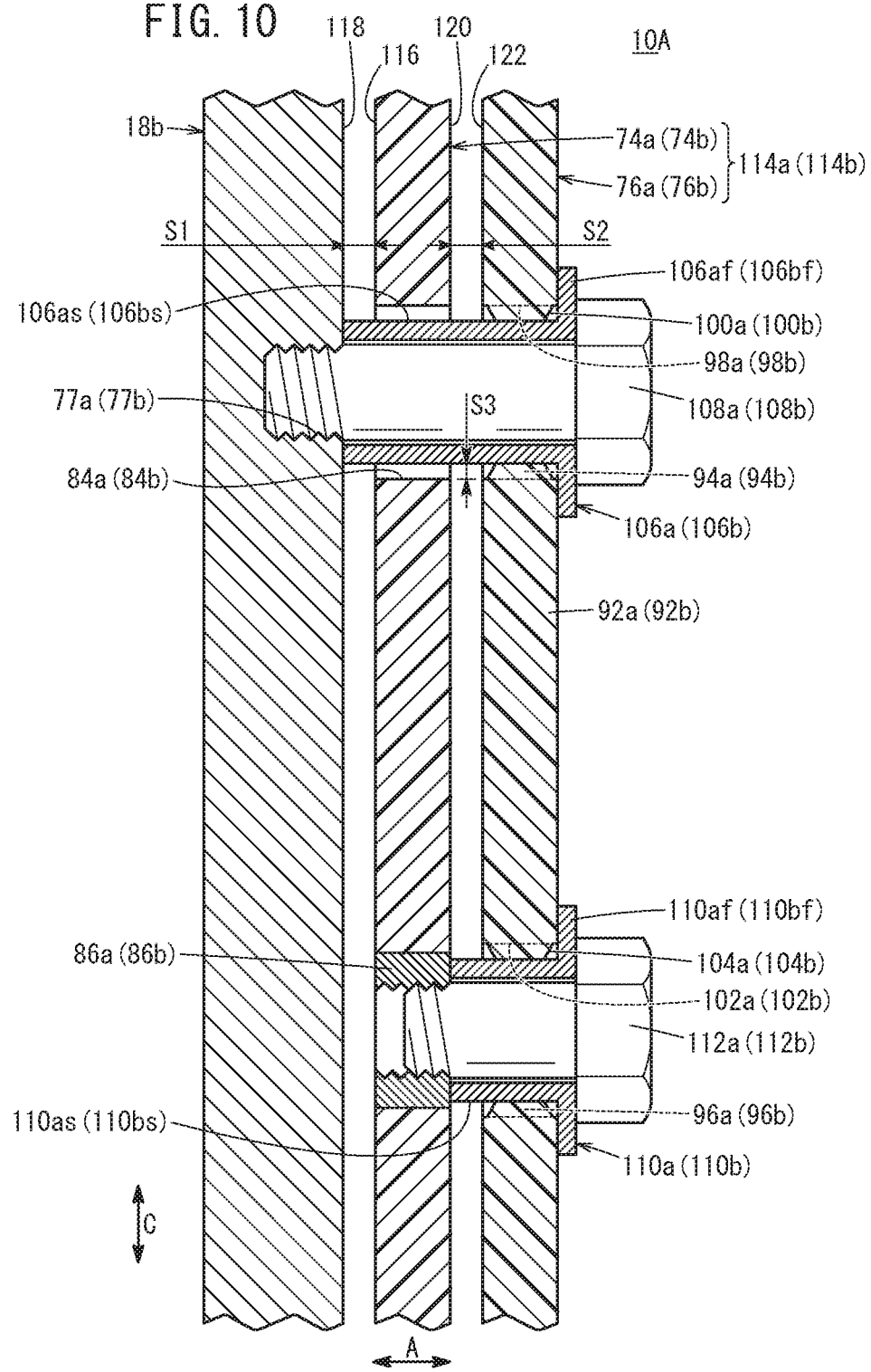
FIG. 10 is a cross sectional view of a coolant supply manifold and a second end plate, taken along a line X-X in FIG. 9.

As shown in FIGS. 9 and 10, projections 100a are provided on the inner circumferential surface 98a of the hole 94a of the flange 92a. The projections 100a support an outer circumferential surface 106as of the cylindrical collar member 106a. The outer circumferential surface 106as may be inclined from the inner circumferential surface 98a. It should be noted that the outer circumferential surface 106as of the cylindrical collar member 106a may be fitted to the inner circumferential surface 98a of the hole 94a without providing the projections 100a in the hole 94a. Further, the outer circumferential surface 110as of the cylindrical collar member 110a may be fitted to the inner circumferential surface 102a of the hole 96a without providing the projections 104a in the hole 96a of the flange 92a.

The manifold base member 74a has a manifold side facing surface 116 facing the second end plate 18b. The second end plate 18b has an end plate side facing surface 118 facing the manifold base member 74a. As shown in FIG. 10, in the state where the coolant supply manifold 114a is tightened to the second end plate 18b, a gap S1 is formed between the manifold side facing surface 116 and the end plate side facing surface 118.

As shown in FIGS. 9 and 10, the manifold base member 74a includes a base side facing surface 120 facing the manifold cover member 76a. The manifold cover member 76a has a cover side facing surface 122 facing the manifold base member 74a. As shown in FIG. 10, in the state where the coolant supply manifold 114a is coupled tightly to the second end plate 18b, a gap S2 is formed between the base side facing surface 120 and the cover side facing surface 122.

The gap S1 is adjusted by determining the size of the cylindrical collar member 106a in the axial direction and the size of the cylindrical collar member 110a in the axial direction. The gap S2 is adjusted by determining the size of the cylindrical collar member 110a in the axial direction. For example, the gaps are in a range of 0.1 mm to 0.4 mm. Preferably, the gap S1 may be larger than the gap S2 (S1>S2).

As shown in FIG. 8, the coolant discharge manifold 114b is fixed to the second end plate 18b. As shown in FIG. 10, the constituent elements of the coolant discharge manifold 114b that are identical to those of the coolant supply manifold 114a are labeled with the same reference numerals and an alphabet "b" instead of "a", and detailed description is omitted.

In the second embodiment, as shown in FIG. 10, in the state where the coolant supply manifold 114a is coupled tightly to the second end plate 18b, a gap S1 is formed between the manifold side facing surface 116 and the end plate side facing surface 118.

Figure 11:
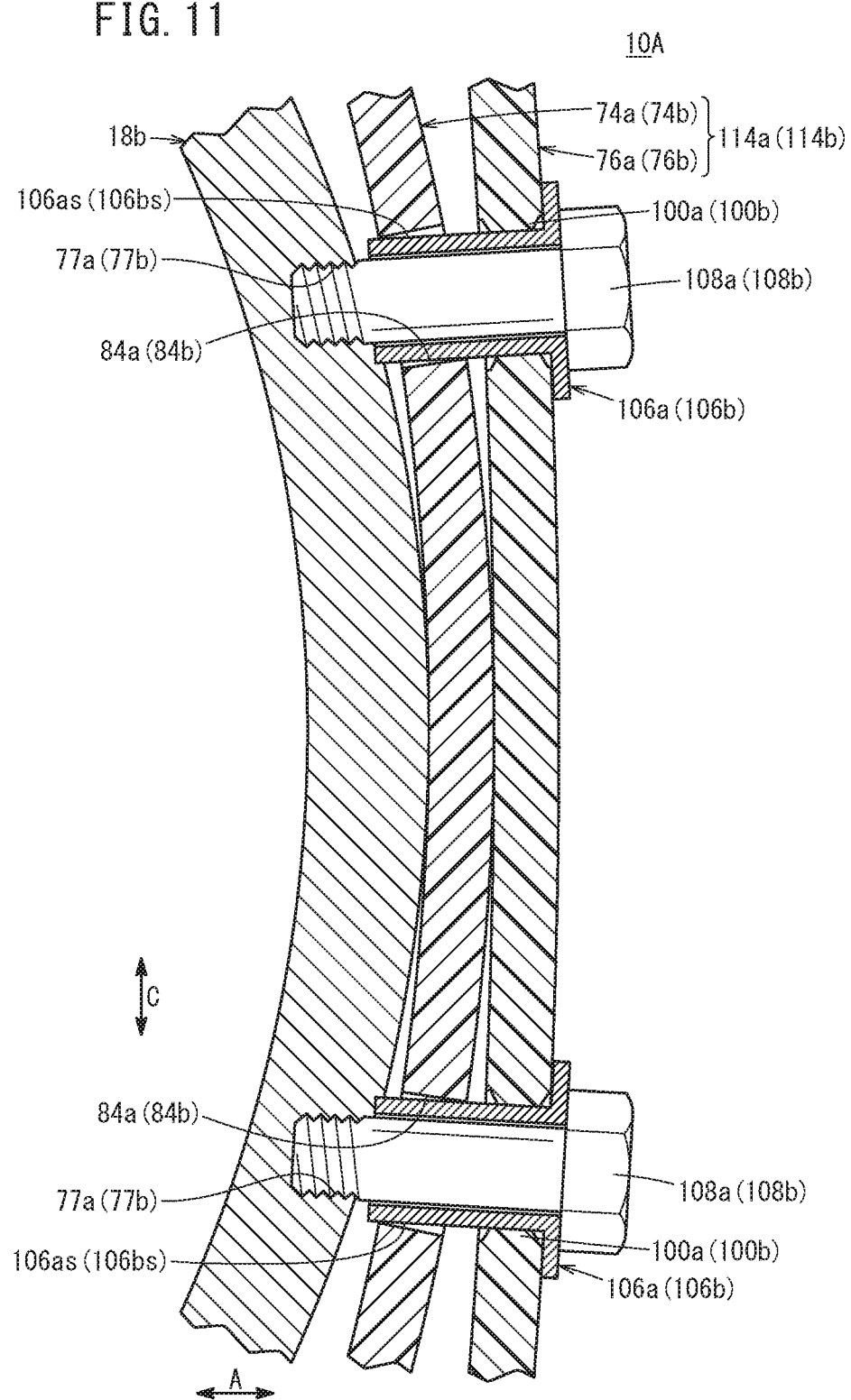
FIG. 11 is a view when the coolant supply manifold and the second end plate in FIG. 9 are deformed.

Therefore, as shown in FIG. 11, when deformation occurs in the second end plate 18b, e.g., when the second end plate 18b is bent by deformation, the gap S1 functions as a clearance for suppressing interference with the second end plate 18b and the coolant supply manifold 114a. Specifically, thanks to the gap S1, in comparison with bending deformation of the second end plate 18b, bending deformation of the manifold base member 74a is suppressed to a small degree. Further, the cylindrical collar member 106a is inserted into the hole 84a with a space S3 in the range of about 0.1 mm to 0.3 mm. In the structure, it is possible to suppress deformation of the manifold base member 74a to a greater extent.

Therefore, for example, it becomes possible to suppress formation of cracks in the coolant supply manifold 114a. Accordingly, it is possible to suppress damage of the coolant supply manifold 114a due to deformation of the second end plate 18b as much as possible, and thus, it becomes possible to use the coolant supply manifold 114a suitably and economically.

Further, as shown in FIG. 10, in the state where the coolant supply manifold 114a is tightly coupled to the second end plate 18b, the gap S2 is formed between the base side facing surface 120 and the cover side facing surface 122.

Therefore, as shown in FIG. 11, when the second end plate 18b is deformed, e.g., bent by deformation, the gap S2 functions as a clearance for suppressing interference with the manifold base member 74a and the manifold cover member 76a. Specifically, thanks to the gap S2, in comparison with bending deformation of the manifold base member 74a, bending deformation of the manifold cover member 76a is suppressed to a small degree.

Thus, in particular, it becomes possible to suppress formation of cracks in the manifold cover member 76a. In the structure, it is possible to suppress damage of the coolant supply manifold 114a due to deformation of the second end plate 18b as much as possible, and thus, it becomes possible to use the coolant supply manifold 114a suitably and economically. In the coolant discharge manifold 114b, the same advantages as in the case of the coolant supply manifold 114a are obtained.

Third Embodiment

Next, a fuel cell stack 10B according to a third embodiment of the present invention will be described. As shown in FIG. 12, the fuel cell stack 10B according to the third embodiment of the present invention includes a coolant supply manifold 132a, and the coolant supply manifold 132a is attached to the second end plate 18b.

The coolant supply manifold 132a is a single component part formed integrally by the manifold base member 74a and the manifold cover member 76a according to the second embodiment. The constituent elements of the third embodiment that are identical to those of the second embodiment are labeled with the same reference numerals, and the detailed description is omitted. The coolant discharge manifold 132b having same structure as the coolant supply manifold 132a is attached to the second end plate 18b.

In the third embodiment having the above structure, in the state where the coolant supply manifold 132a is coupled tightly to the second end plate 18b, a gap S1 is formed between a manifold side facing surface 116 and an end plate side facing surface 118. Therefore, when deformation occurs in the second end plate 18b, the gap S1 functions as a clearance for suppressing interference with the second end plate 18b and the coolant supply manifold 132a.

Therefore, it is possible to suppress damage of the coolant supply manifold 132a due to deformation of the second end plate 18b as much as possible. Accordingly, the same advantages as in the case of the first embodiment are obtained. For example, it becomes possible to use the coolant supply manifold 132a suitably and economically.

What is claim is:

1. A fuel cell stack including a plurality of power generation cells, wherein each of the power generation cells comprises a membrane electrode assembly and a separator that are stacked together, the membrane electrode assembly includes an electrolyte membrane and electrodes provided on both surfaces of the electrolyte membrane, the power generation cells are stacked together in a stacking direction into a stack body, end plates are provided at both ends of the stack body in the stacking direction, and one of the end plates has a resin fluid manifold configured to allow a coolant, a fuel gas, or an oxygen-containing gas as fluid to flow through the resin fluid manifold;

the fuel cell stack comprising:
- a first hole with a plurality of projections formed in the resin fluid manifold, the plurality of projections of the first hole being in contact with an outer circumferential surface of a first cylindrical collar member that is provided in the first hole, wherein the first hole defines a gap between the outer circumferential surface of the first cylindrical collar member and the resin fluid manifold, the gap having a circular arc shape extending along a circumferential direction of the first cylindrical collar member;
- a second hole without projections formed in the resin fluid manifold, the second hole being arranged between the first hole and the one of the end plates, and an inner circumferential surface of the second hole is spaced from the outer circumferential surface of the first cylindrical collar member; and
- a first tightening bolt inserted into the first cylindrical collar member and screwed into the one of the end plates, wherein, in a state where the resin fluid manifold is coupled tightly to the one of the end plates, a first space is formed between a manifold side facing surface of the resin fluid manifold that faces the one of the end plates and an end plate side facing surface of the one of the end plates that faces the resin fluid manifold, the first cylindrical collar member protrudes from the manifold side facing surface toward the end plate side facing surface to form the first space, wherein the resin fluid manifold comprises:
- a manifold base member adjacent to the one of the end plates; and
- a manifold cover member fixed to and overlapped with the manifold base member, a fluid channel being formed between the manifold base member and the manifold cover member, wherein an outer marginal portion of the manifold cover member includes a flange in which the first hole is formed, and an outer marginal portion of the manifold base member includes the second hole and a base side facing surface that faces the flange of the manifold cover member, a second space is formed between the base side facing surface and the flange, the flange of the manifold cover member includes a third hole in which a second cylindrical collar member is provided, the second cylindrical collar member is shorter than the first cylindrical collar member in the stacking direction, and protrudes from the third hole toward the manifold base member to form the second space, and the manifold base member is fixed to the manifold cover member by a second tightening bolt inserted into the second cylindrical collar member.

2. The fuel cell stack according to claim 1, wherein at least one of the spaces has a size in a range of 0.1 mm to 0.4 mm.

* * * * *